No. 810,707. PATENTED JAN. 23, 1906.
J. D. BRAZIER & D. O. SULLIVAN.
GRABOT MACHINE.
APPLICATION FILED JULY 7, 1904.

2 SHEETS—SHEET 1.

WITNESSES:
Edward Thorpe.
A. E. Fay.

INVENTORS
James D. Brazier
Daniel O. Sullivan
BY
Munn
ATTORNEYS

No. 810,707. PATENTED JAN. 23, 1906.
J. D. BRAZIER & D. O. SULLIVAN.
GRABOT MACHINE.
APPLICATION FILED JULY 7, 1904.

2 SHEETS—SHEET 2.

WITNESSES:
Edward Thorpe.
A. E. Fay.

INVENTORS
James D. Brazier
Daniel O. Sullivan
BY
ATTORNEYS

UNITED STATES PATENT OFFICE.

JAMES D. BRAZIER AND DANIEL O. SULLIVAN, OF VICKSBURG, MISSISSIPPI, ASSIGNORS, BY MESNE ASSIGNMENTS, OF ONE-HALF TO BERNARD SIANI, OF ROLLING FORK, MISSISSIPPI.

GRABOT-MACHINE.

No. 810,707.   Specification of Letters Patent.   Patented Jan. 23, 1906.

Application filed July 7, 1904. Serial No. 215,673.

*To all whom it may concern:*

Be it known that we, JAMES D. BRAZIER and DANIEL O. SULLIVAN, citizens of the United States, and residents of Vicksburg, in the county of Warren and State of Mississippi, have invented a new and Improved Grabot-Machine, of which the following is a full, clear, and exact description.

Our invention relates to a grabot-machine for separating cotton locks and seeds from the hulls as the material comes from the boll-screen.

The objects of the invention are to provide for the rapid and effective separation of the materials mentioned and the distribution thereof in separate places.

Reference is to be had to the accompanying drawings, forming a part of this specification, in which similar characters of reference indicate corresponding parts in both the figures.

Figure 1:
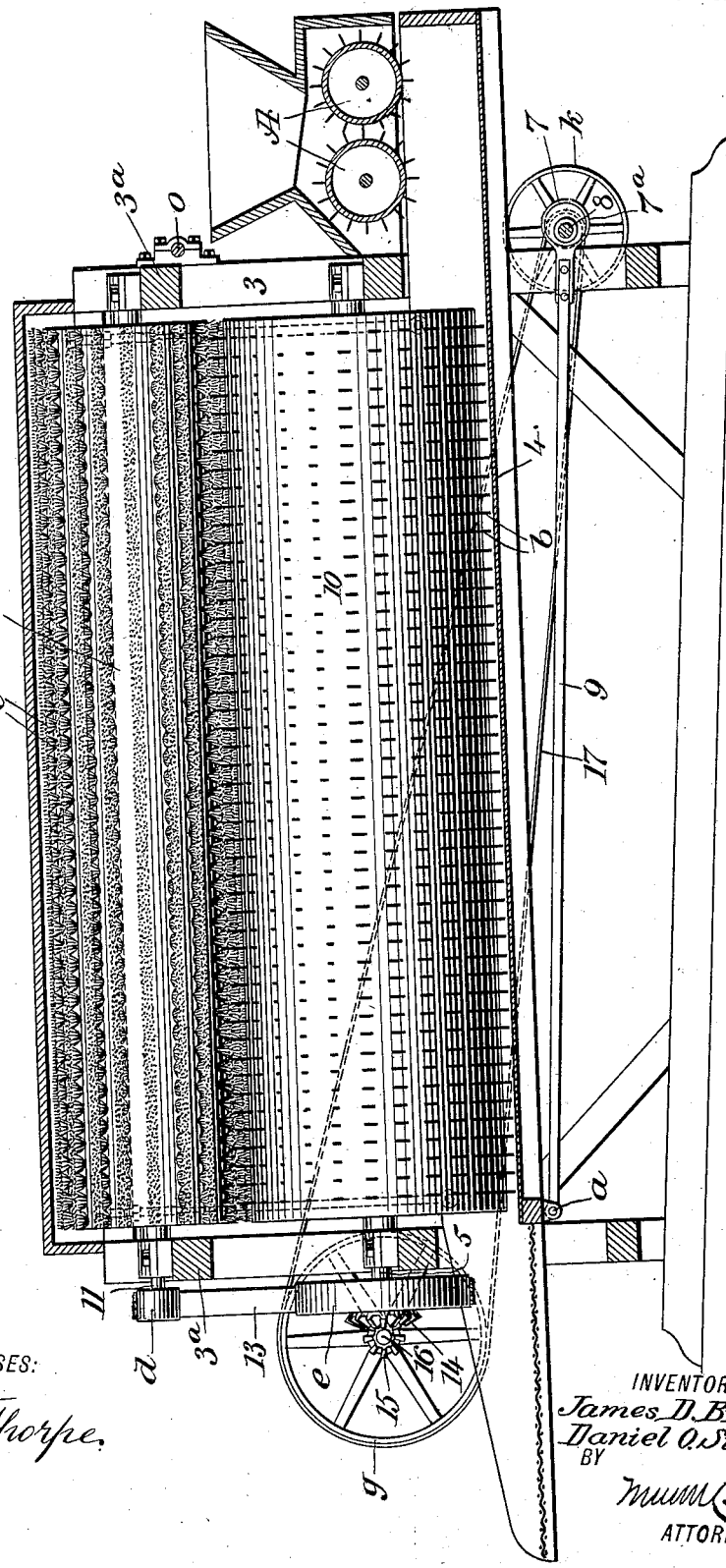
Figure 2:
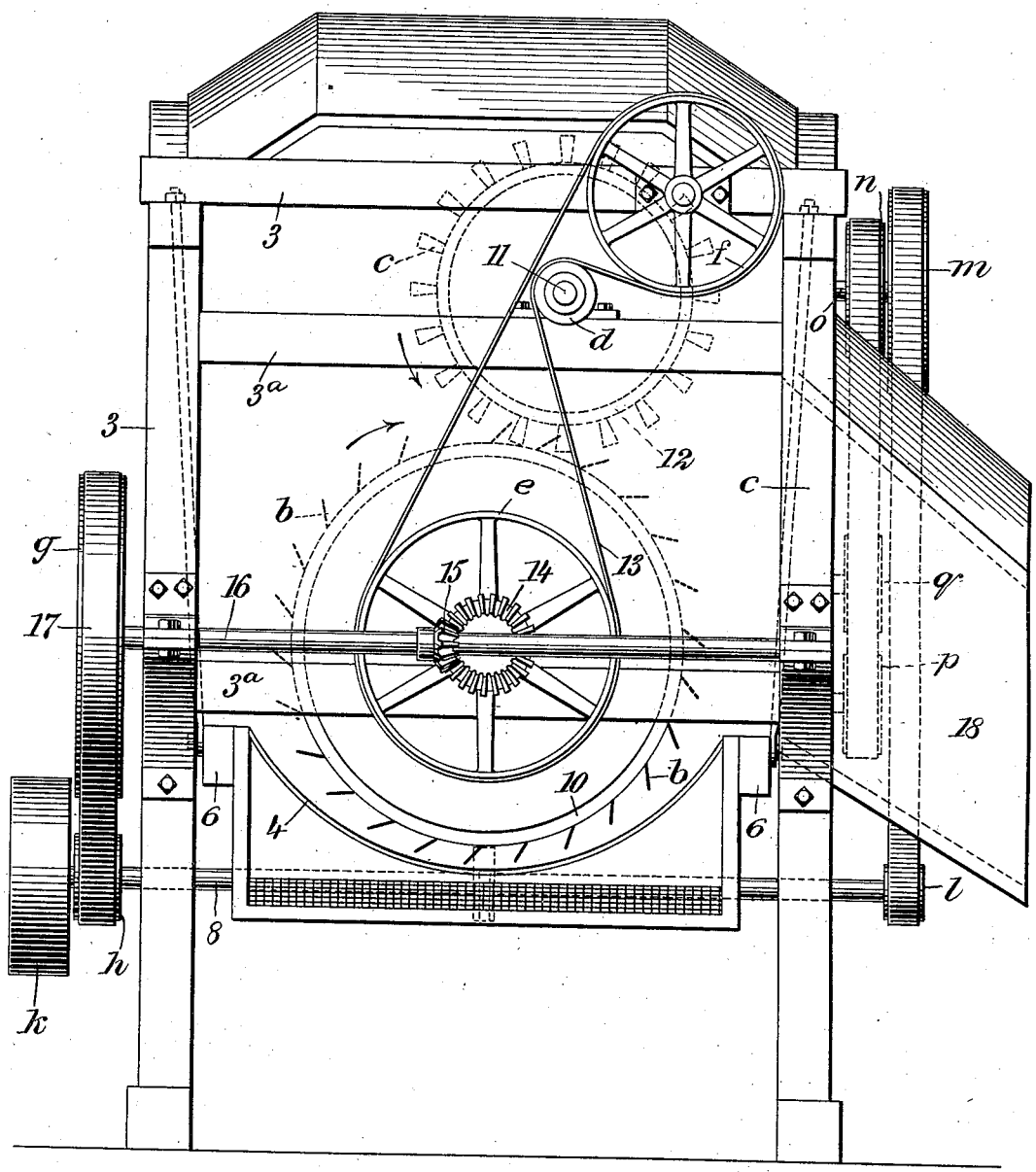

Figure 1 is a longitudinal sectional view of a preferred form of our machine, showing the interior parts thereof in elevation; and Fig. 2 is an end view of the same.

3 represents an upright rectangular frame sufficiently elongated for supporting the operative parts of the machine and to adapt the same for effective service. This frame is inclined longitudinally, so as to depress the front end of the machine to a slight extent for discharging certain parts of the material separated. Upon the lower portion of the frame 3 a feed-shaker 4 is supported and is inclined downward at its front end to a suitable degree in the same manner as the frame is inclined. The shaker is in cross-section of the shape of an arc of a circle. At the center of this arc is a longitudinal shaft 5, which is journaled in the ends of the frame 3. In the transverse members $3^a$ of the frame the shaker 4 is held to swing longitudinally by means of rocking hangers 6. The shaker is of such length as to extend beyond the frame at both ends thereof.

Mounted upon the shaft 5 is a drum 10, which is provided with inclined teeth $b$, and above this drum upon a shaft 11 is a second drum 12, provided with several series of brush-tufts $c$. The shafts 5 and 11 are inclined in the same manner as the frame and the shaker and are parallel with each other. The shafts are located sufficiently far apart to permit the drums to rotate and to cause the brush-tufts to pass over the teeth $b$ and substantially in contact with the drum 10.

A is a breaker for the material to go through for the usual preliminary operation before it passes into the grabot-machine.

The device is operated from the pulley $k$ upon a shaft 8, which passes across the frame transversely at the rear of the machine. Upon this shaft there is a pulley $h$, which by means of a belt 17 drives a pulley $g$ upon a shaft 16, which also runs transverse to the frame and is located on the front end of the machine. This shaft 16 carries a bevel-pinion 15, which meshes with a bevel-gear 14 upon the shaft 5, and consequently drives this shaft and the drum 10, mounted thereon. The shaft 5 is also provided with a pulley $e$, which by means of a belt 13 drives a pulley $d$, which is attached to the shaft 11, and rotates that shaft. The pulley $f$ is an idler used in an obvious manner with the belt 13.

Upon one side of the machine is a pulley $l$, attached to the shaft 8 and connected, by means of a belt, with a pulley $m$, which drives in turn a pulley $n$, both these last-named pulleys being mounted on a stud-shaft $o$. A belt from the pulley $n$ serves to drive a pulley $p$, which is connected with the breaker A in a manner not shown, and serves to drive the breaker. $q$ represents an idler. This manner of connecting the grabot-machine with the breaker does not form a part of our invention, but is merely illustrated to show how the machine is used.

Upon the shaft 8, and preferably between the two parts of the frame, is mounted an eccentric 7, which is adjusted to give a jolting movement to the shaker 4 by means of an eccentric-strap $7^a$ and rod 9, the latter having one end attached loosely to the eccentric-strap and the other connected to the shaker at the point $a$.

The operation of the device will be as follows: The cotton with hulls and seeds is fed into the breaker A and passes from there to the upper end of the shaker 4. Upon the application of power to the pulley $k$ the drums will be rotated in the directon of the arrows in Fig. 2—that is, the lower drum will be operated in the direction of the inclination of its teeth and the upper drum in the opposite direction. The cotton will be picked up by the advancing teeth b, leaving the hulls and seed in the shaker, and carried upwardly around the drum to the brushes c. The drum 12 is geared to rotate at a much higher rate of speed than the drum 10, preferably at about four times the circumferential speed, and consequently the brushes c will pass along the teeth in the general direction of their inclination at a higher rate of speed than the teeth and will pull the cotton from them. The cotton in passing downwardly along the body of the shaker, which is continuously agitated by the operation of the eccentric, may pass several times around the drum 10 and be submitted to the cleaning operation several times in the course of its passage through the machine. It will be discharged from the drum 12 into the chute 18, from which it passes out of the machine. The seeds and hulls that have been separated from the cotton, as described, will pass along in the shaker 4 by gravity, aided by the agitation of the shaker and sliding down the shaker will pass out at the lower end thereof.

It will be obvious that our invention is capable of other embodiments than the one illustrated in the drawings and that it is not limited thereto. Many modifications may be made therein without departing from the spirit of our invention.

Having thus described our invention, we claim as new and desire to secure by Letters Patent—

1. A cotton-separator comprising a drum having teeth, a drum having brush-tufts, said teeth and tufts being in contact, a shaker located below the toothed drum, and means for simultaneously rotating the drums.

2. A cotton-separator comprising a toothed drum, a brush-drum, a shaker below the toothed drum, means for rotating the drums in opposite directions, with the teeth and brushes thereof in engagement with each other, and means for simultaneously agitating the shaker.

3. A cotton-separator comprising a toothed drum, a brush-drum located above said toothed drum and parallel therewith, a shaker located below the toothed drum, means for rotating the drums, and means for agitating the shaker.

4. A cotton-separator comprising a drum having inclined teeth, a brush-drum engaging with said teeth, means for rotating the toothed drum in the direction of the inclination of the teeth, means for rotating the brush-drum in the opposite direction at a greater circumferential speed, a shaker below the toothed drum, and means for agitating the shaker.

5. A cotton-separator comprising a drum having inclined teeth, a drum having brush-tufts, said drums being located in proximity to each other, a curved shaker located immediately below said toothed drum, means for rotating said toothed drum in the direction of inclination of its teeth, means for rotating said brush-drum in the opposite direction at a greater circumferential speed, and means for simultaneously agitating said shaker.

6. A cotton-separator comprising a drum having inclined teeth, a drum having brush-tufts, means for rotating said first-named drum in the direction of inclination of its teeth for the purpose of collecting fibrous material, means for rotating said drum having brush-tufts in the opposite direction, with the brush-tufts in engagement with the teeth and for removing the fibrous material from the teeth, an inclined screen below the first-named drum, and means for agitating said screen to cause solid material thereon to be fed in the direction of the inclination of the screen.

7. In a separator, the combination with a frame, and a shaker on the lower portion of the frame, of a toothed drum rotatable on the frame over the shaker, a brush-drum rotatable on the frame above the toothed drum, means for rotating the drums in opposite directions, and means for shaking the shaker.

8. In a separator, the combination with a frame, a transversely-curved shaker on the frame, and an eccentric device adapted to agitate the shaker, of a drum rotatable longitudinally on the frame above the shaker, inclined teeth on the shell of said drum, a drum rotatable on the frame above the toothed drum and having brush-tufts thereon that pass between the teeth of the lower drum, pulleys on the drum-shafts, a crossed belt connecting said pulleys, and gearing adapted to rotate the lower-drum shaft.

In testimony whereof we have signed our names to this specification in the presence of two subscribing witnesses.

JAS. D. BRAZIER.
DANL. O. SULLIVAN.

Witnesses:
CHAS. EHRMAN,
F. W. LITTLE.

Correction in Letters Patent No. 810,707.

It is hereby certified that Letters Patent No. 810,707, granted January 23, 1906, upon the application of James D. Brazier and Daniel O. Sullivan, of Vicksburg, Mississippi, for an improvement in "Grabot-Machines," were erroneously issued to said Brazier and Sullivan and Bernard Siani, as assignee, by mesne assignments, of one-half interest in said invention; whereas said Letters Patent should have been issued to said *Brazier and Bernard Siani, as assignees by direct and mesne assignments, each being owner of one-half interest in said invention,* as shown by the record of assignments in this office; and that the said Letters Patent should be read with this correction therein that the same may conform to the record of the case in the Patent Office.

Signed and sealed this 6th day of March, A. D., 1906.

[SEAL.]

F. I. ALLEN,
*Commissioner of Patents.*